United States Patent [19]

Röhm

[11] Patent Number: 5,286,041
[45] Date of Patent: Feb. 15, 1994

[54] DRILL CHUCK

[76] Inventor: Günter H. Röhm, Heinrich-Röm-Strasse 50, D-7927 Sontheim, Fed. Rep. of Germany

[21] Appl. No.: 931,287

[22] Filed: Aug. 17, 1992

[30] Foreign Application Priority Data

Aug. 31, 1991 [DE] Fed. Rep. of Germany ....... 4129048
Jan. 31, 1992 [EP] European Pat. Off. ........ 92101585.5

[51] Int. Cl.⁵ ............................................. B23B 31/12
[52] U.S. Cl. ........................................ 279/60; 279/62; 279/63; 279/140; 279/902
[58] Field of Search ..................... 279/60-65, 279/140, 902, 28, 30, 123

[56] References Cited

U.S. PATENT DOCUMENTS

| | | |
|---|---|---|
| 1,894,515 | 1/1933 | Hubbell . |
| 2,534,616 | 12/1950 | Milligan .......................... 279/123 X |
| 2,546,351 | 3/1951 | Stoner ............................. 279/53 X |
| 2,584,303 | 2/1952 | Stoner ............................. 279/46.7 |
| 3,558,146 | 1/1971 | Mayers et al. ................... 279/123 X |
| 4,752,165 | 6/1988 | Wanner ........................... 279/60 X |
| 4,836,563 | 6/1989 | Röhm ............................. 279/60 X |

FOREIGN PATENT DOCUMENTS

3727147A1  2/1989  Fed. Rep. of Germany .

Primary Examiner—Steven C. Bishop
Attorney, Agent, or Firm—Herbert Dubno; Andrew Wilford

[57] ABSTRACT

A drill chuck for use with a tool having a shaft has a chuck body centered on and rotatable about an axis and an adjustment body centered on the axis, rotatable about the axis on the chuck body, and axially fixed on the chuck body. One of the bodies is formed with a plurality of angularly equispaced jaw-guide passages centered on respective jaw axes all lying on the surface of an imaginary cone centered on the axis. The other of the bodies is formed with a screwthread centered on the axis and exposed in the guide passages. Respective jaws displaceable in the passages along the respective axes are each formed with a row of teeth meshing with the screwthread so that relative rotation of the bodies in one direction moves the jaws radially inward and axially forward and opposite relative rotation moves the jaws radially outward and axially backward. Each of the jaws is formed with a generally axially extending entrainment ridge projecting radially inward relative to the chuck axis from the respective jaw, lying offset forward in a normal rotation direction of the chuck when drilling from a respective jaw plane including the respective passage axis and the chuck axis, and lying mainly within an imaginary cone defined by the jaw axes and centered on the chuck axis.

15 Claims, 18 Drawing Sheets

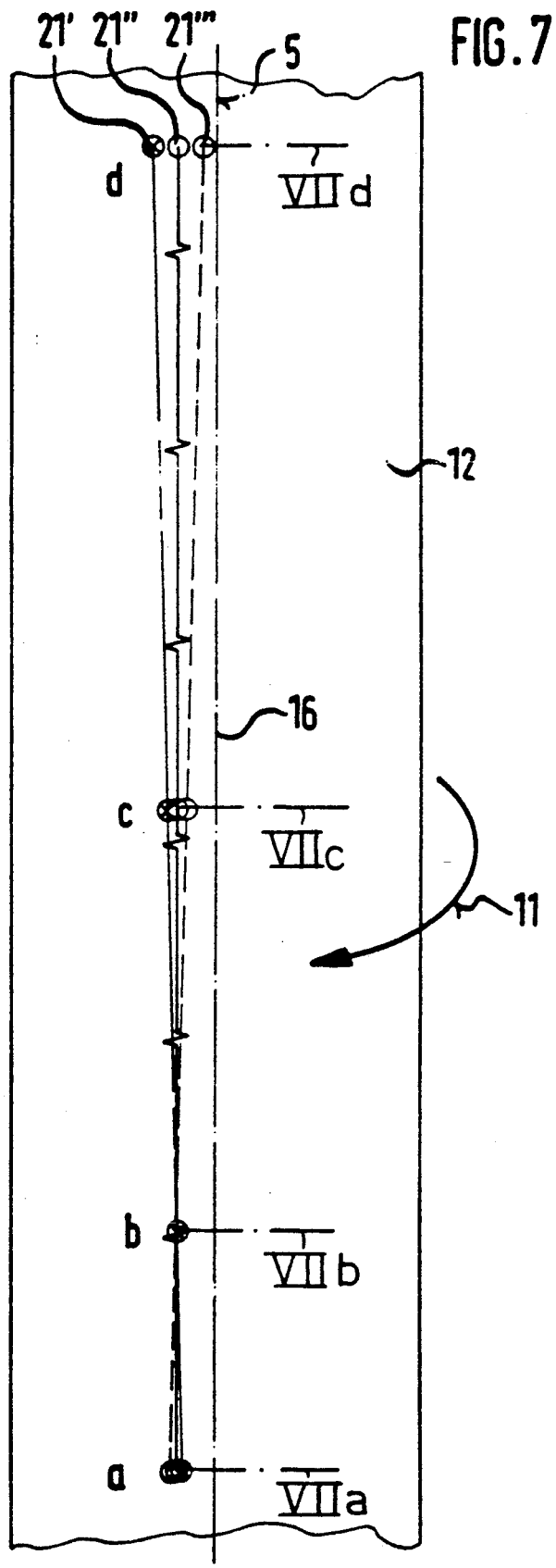

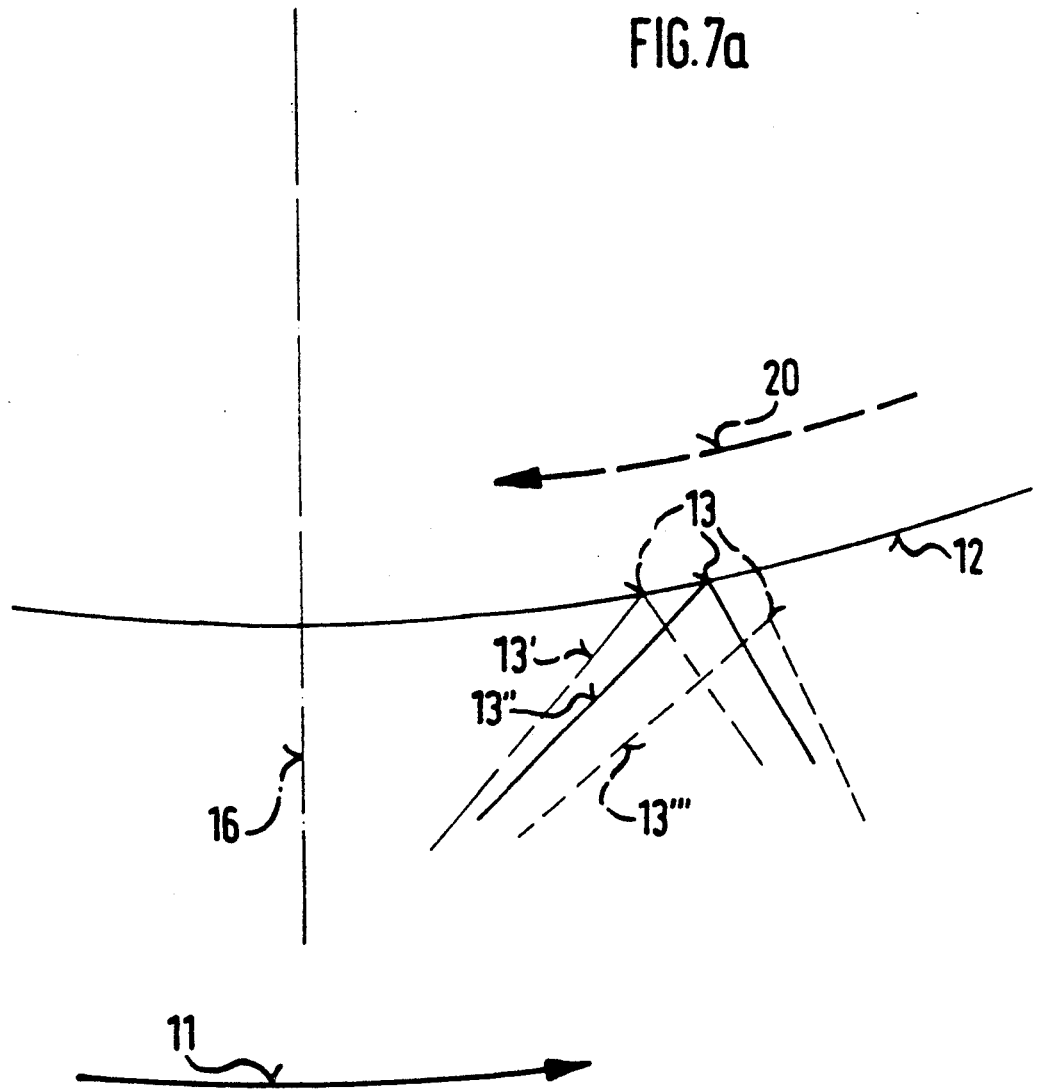

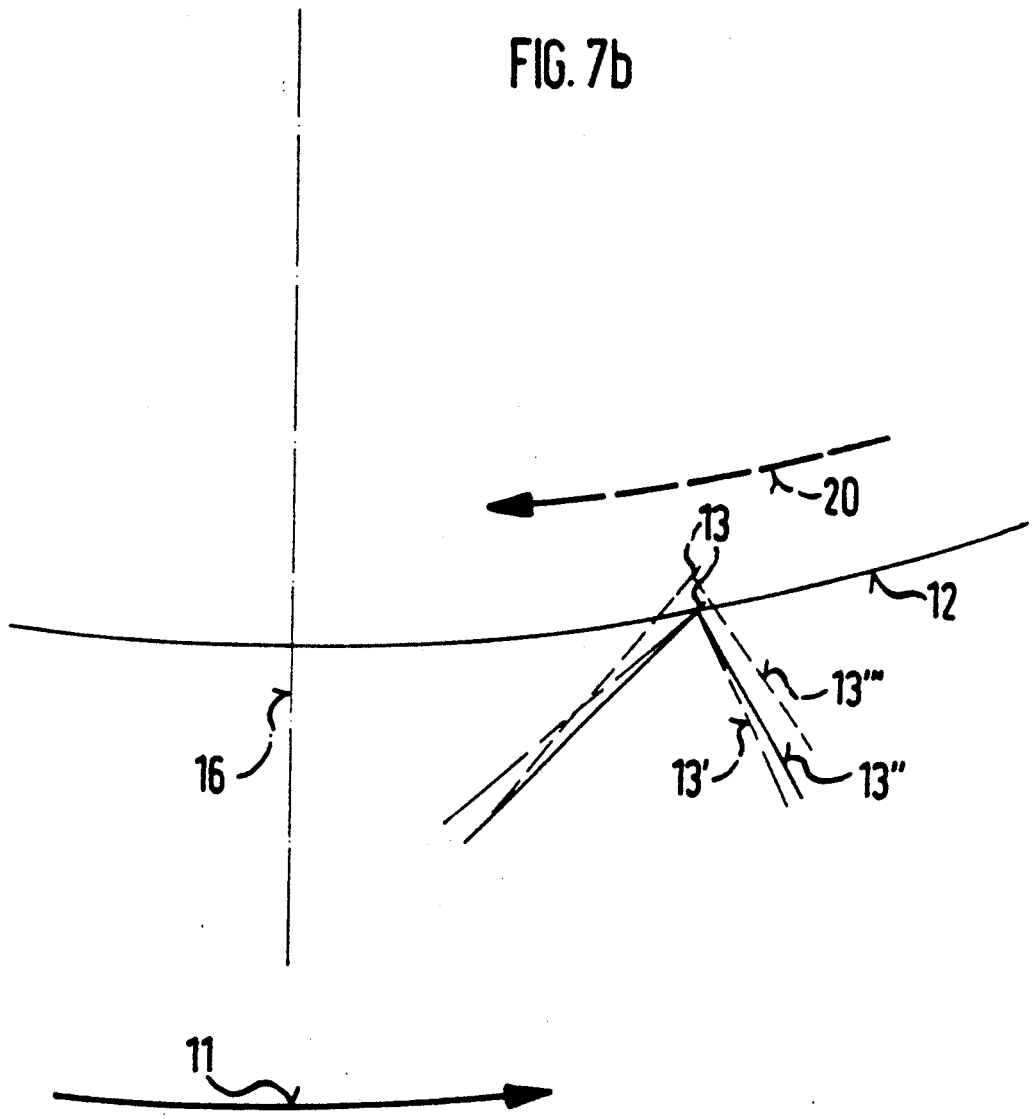

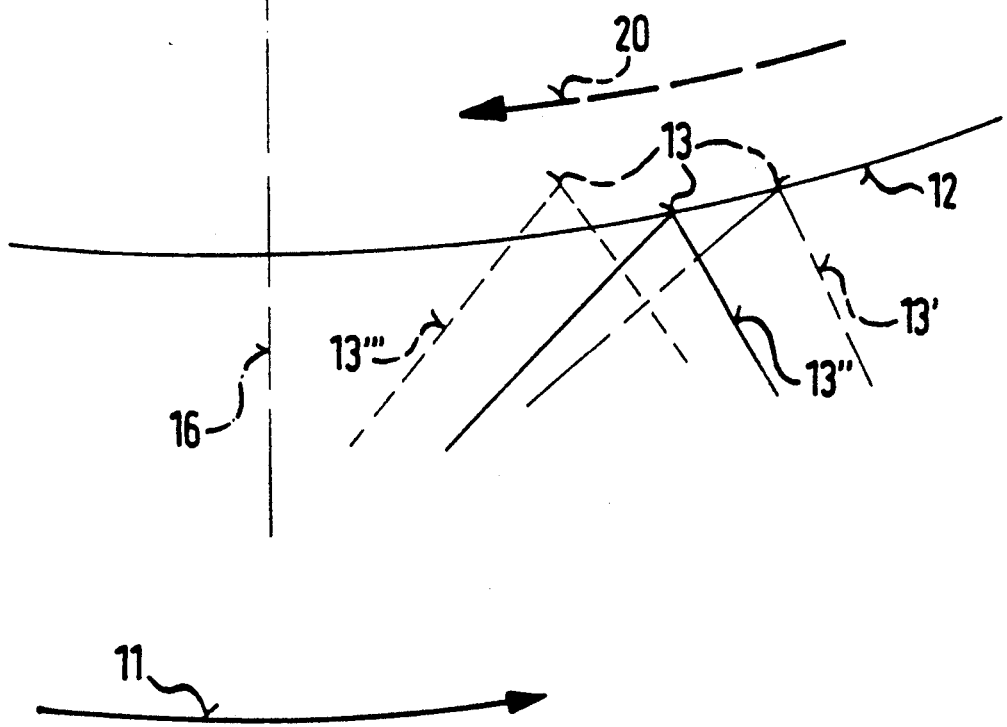

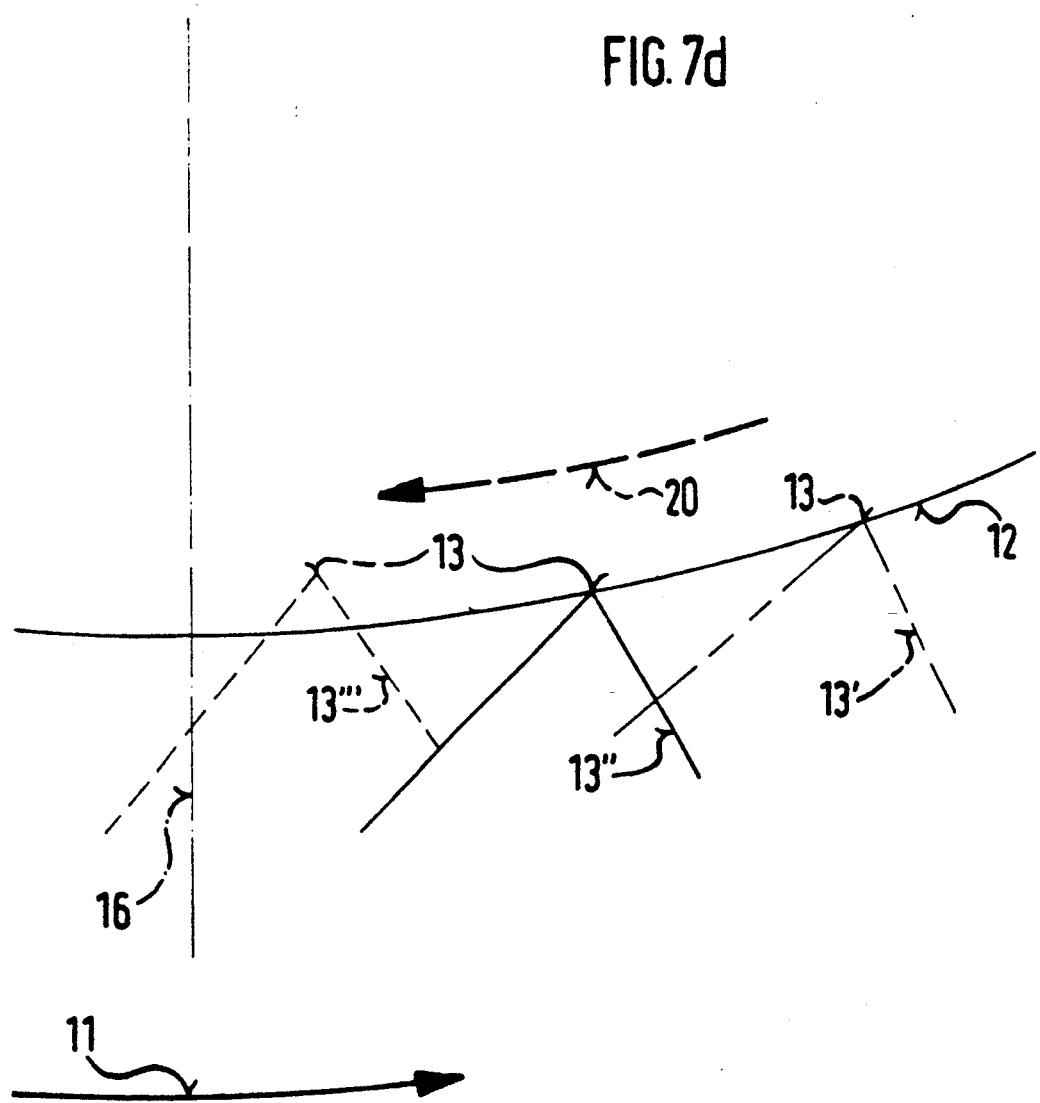

DRILL CHUCK

FIELD OF THE INVENTION

The present invention relates to a drill chuck. More particularly this invention concerns such a chuck which is used on a power drill, even on a so-called hammer drill.

BACKGROUND OF THE INVENTION

A drill chuck such as described in German patent document 3,727,147 for use with a tool having a shaft typically has a chuck body centered on and rotatable about an axis and an adjustment body centered on the axis, rotatable about the axis on the chuck body, and axially fixed on the chuck body. One of the bodies is formed with a plurality of angularly equispaced jaw-guide passages centered on respective jaw axes all lying on the surface of an imaginary cone centered on the axis. The other of the bodies is formed with a screwthread centered on the axis and exposed in the guide passages. Respective jaws displaceable in the passages along the respective axes are each formed with a row of teeth meshing with the screwthread so that relative rotation of the bodies in one direction moves the jaws radially inward and axially forward and opposite relative rotation moves the jaws radially outward and axially backward.

Such a chuck is often set up to be self-tightening by forming the passages in the adjustment body and is provided with a locking ring that is axially and limitedly angularly displaceable on the chuck body and engageable with teeth on the adjustment body to limit its rotation As the chuck is used the torque imparted to it tends to screw down the jaws, tightening them on the tool.

In U.S. Pat. No. 1,894,515 of Hubbel a nontightening chuck is described whose jaws are each formed with a generally axially extending entrainment ridge projecting radially inward and engaging the tool behind a plane drawn from the respective jaw axis to the chuck axis. Thus as the chuck is tightened the jaws are twisted in the passage to lock them all tightly in place with the ridges in a rear-pointing position. Thus when the chuck is used, however, the jaws are twisted all the way back, so that there is no tightening action and it is in fact fairly common for the tool to slip so that the chuck has to be retightened.

OBJECTS OF THE INVENTION

It is therefore an object of the present invention to provide an improved drill chuck.

Another object is the provision of such an improved drill chuck which overcomes the above-given disadvantages, that is which stays tight and even tightens itself limitedly when not made in the normal self-tightening manner.

SUMMARY OF THE INVENTION

A drill chuck for use with a tool having a shaft according to the invention is constituted as described above. In addition each of the jaws is formed with a generally axially extending entrainment ridge projecting radially inward relative to the chuck axis from the respective jaw, lying offset forward in a normal rotation direction of the chuck when drilling from a respective jaw plane including the respective passage axis and the chuck axis, and lying mainly within an imaginary cone defined by the jaw axes and centered on the chuck axis.

Thus with this system once the chuck is tightened it is in a forward-pointing end position. When used the torque of drilling will tend to rotate the jaws back, thereby causing them to cam their ridges eccentrically in and tighten on the tool. Since most of each ridge, normally at least three-quarters if not all, lies within the above-mentioned cone, there will be substantial self-tightening action even in a conventionally designed chuck, that is with the passages in the body. The edges of the ridges need not be straight, but must be set forward of the respective jaw planes sufficiently that during drilling they do not move back and cross this plane, even when they dig into the tool shaft.

In order to minimize any possibility of loosening, in particular in a hammer drill, each jaw is further formed offset from the respective first-mentioned ridge with a second such ridge lying relative to the normal rotation direction behind the respective first ridge. Each second ridge is offset radially of the respective jaw axis inward with respect to the respective first ridge from a respective plane perpendicular to the respective jaw plane. The radial offset between the two ridges is about 0.1 mm and is generally equal to the thickness of a spur dug up by the first ridge. Furthermore each second ridge is offset behind the jaw plane by a spacing that is smaller than a spacing by which the respective first ridge is offset ahead of the jaw plane relative to the rotation direction. Normally each second ridge is offset behind the jaw plane by about 0.25 mm and the respective first ridge is offset ahead of the jaw plane by about 0.55 mm. Furthermore each first ridge has a flank angle of about 60° and is symmetrical to a first-ridge plane parallel to the respective jaw plane and each second ridge has a flank angle of about 90° and a front flank inclined at about 30° to the respective jaw plane and a rear flank inclined at about 60° to the respective jaw plane.

To insure that the jaws are always set right to start with, a spring unit is engaged between the jaws and at least one of the bodies for urging the jaws angularly of the respective jaw axes into a forward-pointing position relative to the rotation direction. In a standard embodiment a spring ring radially engages the jaws. The ring can be split or annularly continuous. The jaws can be formed with angularly throughgoing bores through which the spring ring extends. It can bear radially inward on the jaws and the ring and chuck body can be formed with complementary and radially engaging flats. The ring can also be provided at each jaw with a bumper engaging the respective jaw offset from the respective jaw plane. Alternately the spring can be constituted by respective elastic bumpers on the jaws offset from the respective jaw planes and radially engaging one of the bodies.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 7 is a large-scale side view of a tool shaft showing various jaw positions;

FIGS. 7a through 7d are large-scale diagrammatic end views illustrating jaw positions shown in FIG. 7 taken at levels indicated by respective lines VIIa through VIId in FIG. 7;

DESCRIPTION

Figure 1:
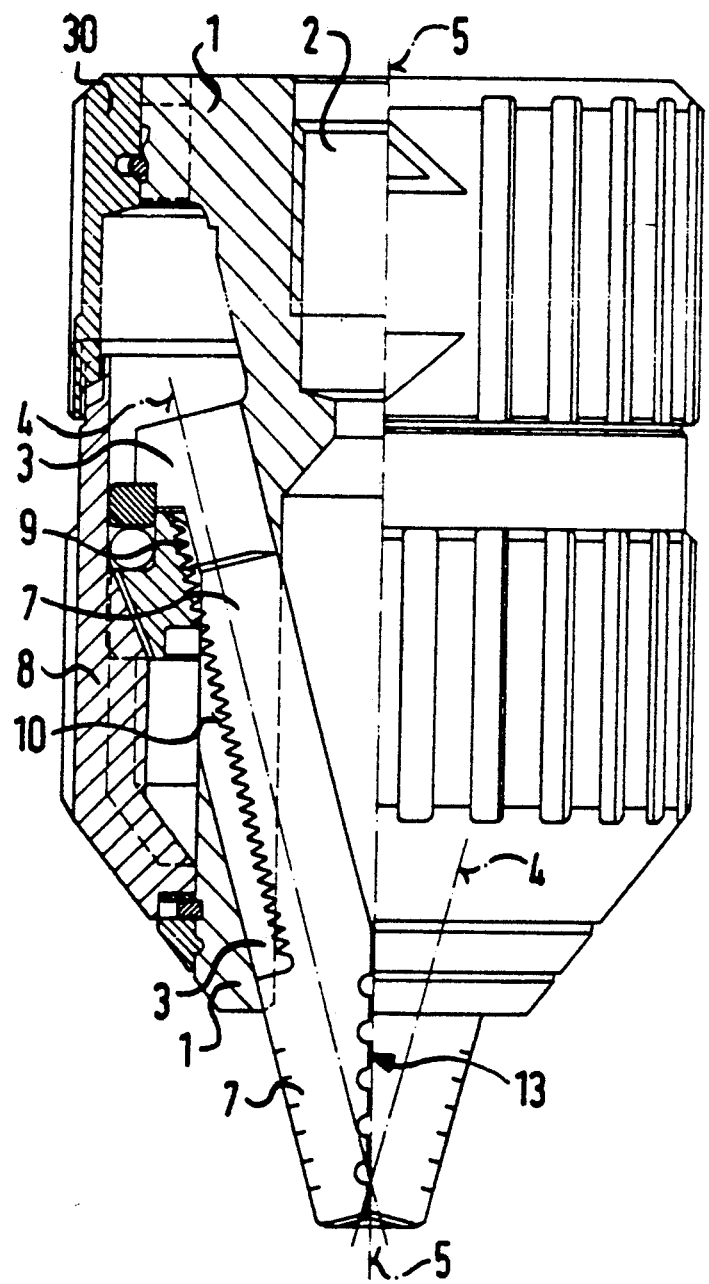
FIG. 1 is a side view partly in axial section through a chuck according to the invention.
Figure 2:
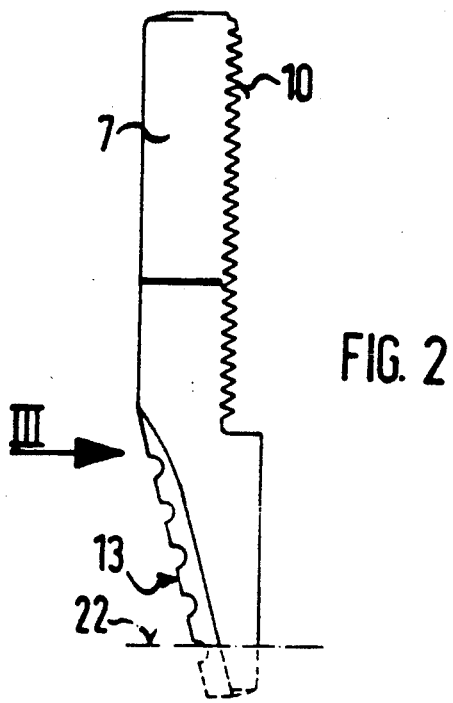
FIG. 2 is a side view of a jaw of the FIG. 1 chuck.
Figure 3:
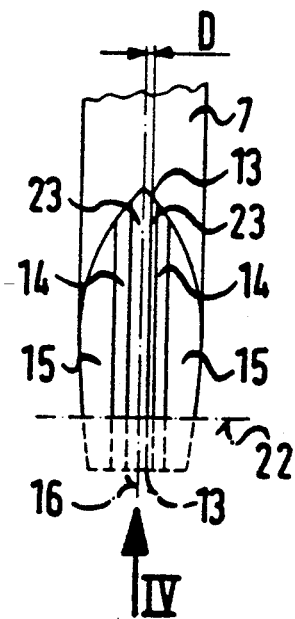
FIG. 3 is a large-scale detail view taken in the direction of arrow III of FIG. 2.
Figure 4:
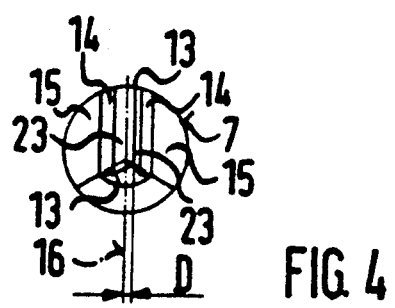
FIG. 4 is an end view taken in the direction of arrow IV of FIG. 3.
Figure 10:
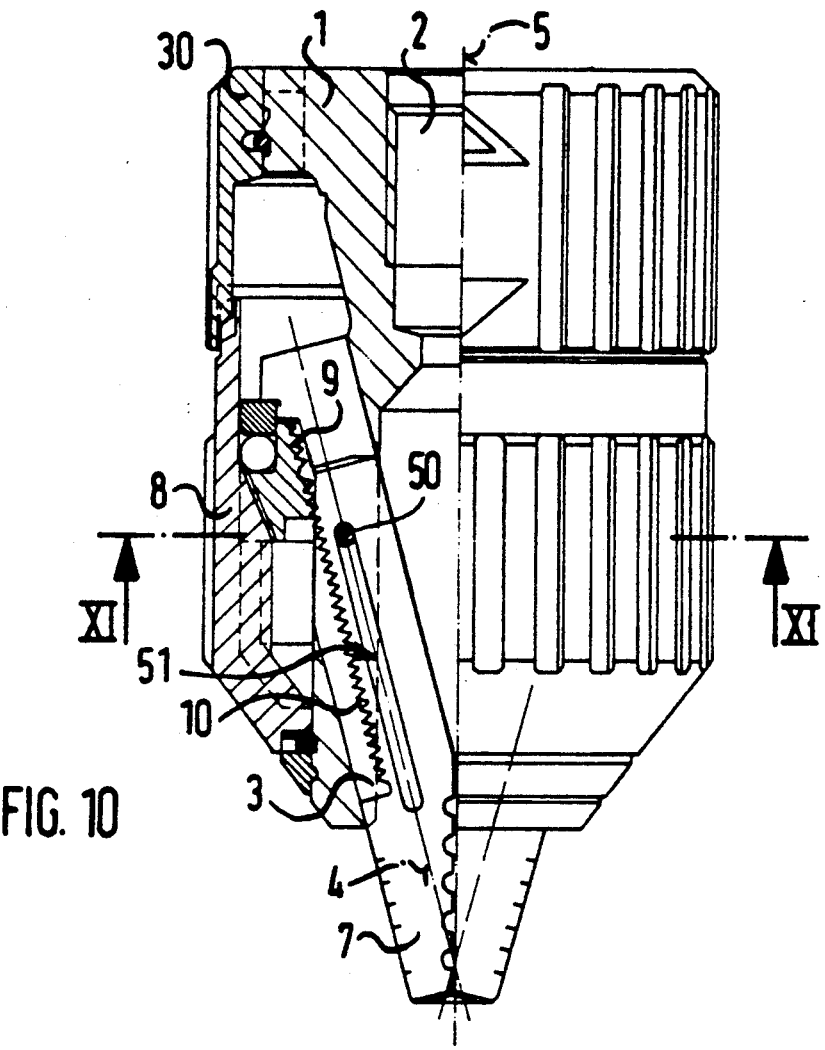
FIG. 10 is a view like FIG. 1 of yet another chuck.
Figure 11:
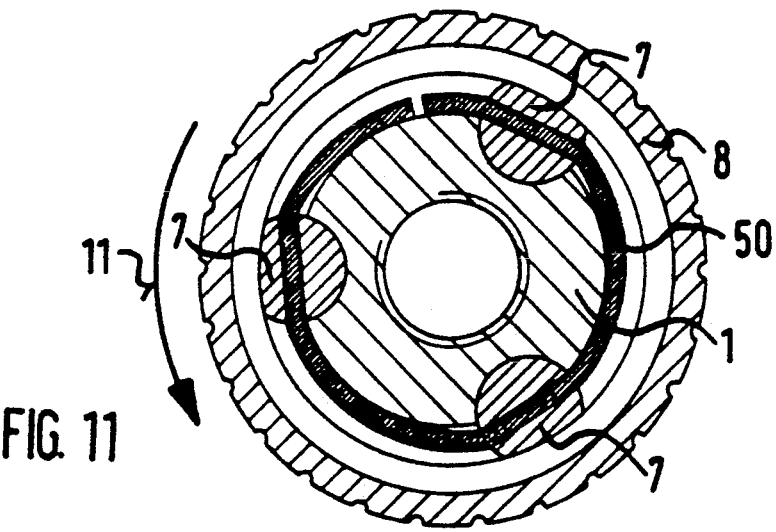
FIG. 11 is a section taken along line XI—XI of FIG. 10.
Figure 13:
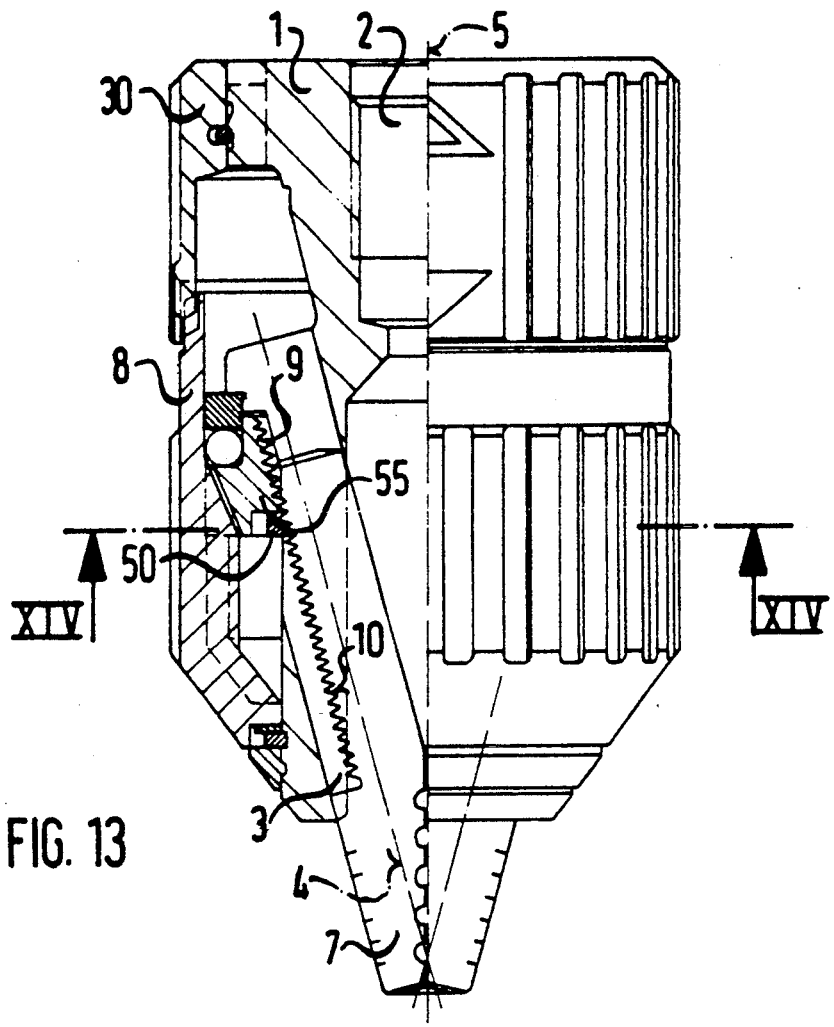
FIG. 13 is a view like FIG. 1 of another chuck.

As seen in FIGS. 1, 10, and 13, a standard chuck has a chuck body 1 formed at its axis 5 with a rearwardly open threaded bore 2 adapted to receive the threaded spindle of a driving unit. The body 1 is formed with three circular-section guide passages 3 extending along respective axes 4 together defining a cone 6 centered on the axis 5. Each passage 3 holds a respective jaw 7 having an outer edge formed with a row of teeth 10 engaging a screwthread 9 formed on an adjustment sleeve 8 that is rotatable on the chuck body 1 about the axis 5 but axially fixed thereon. Thus as is well known rotation of the sleeve 8 in a forward direction 11 on the body 1 will move the jaws 7 radially outward and axially backward and opposite rotation will move them oppositely. A standard locking ring 30 is provided that can move axially but not angularly on the body and that has teeth engaging in teeth of the adjustment sleeve 8 to lock it in place as is know per se.

Figure 5:
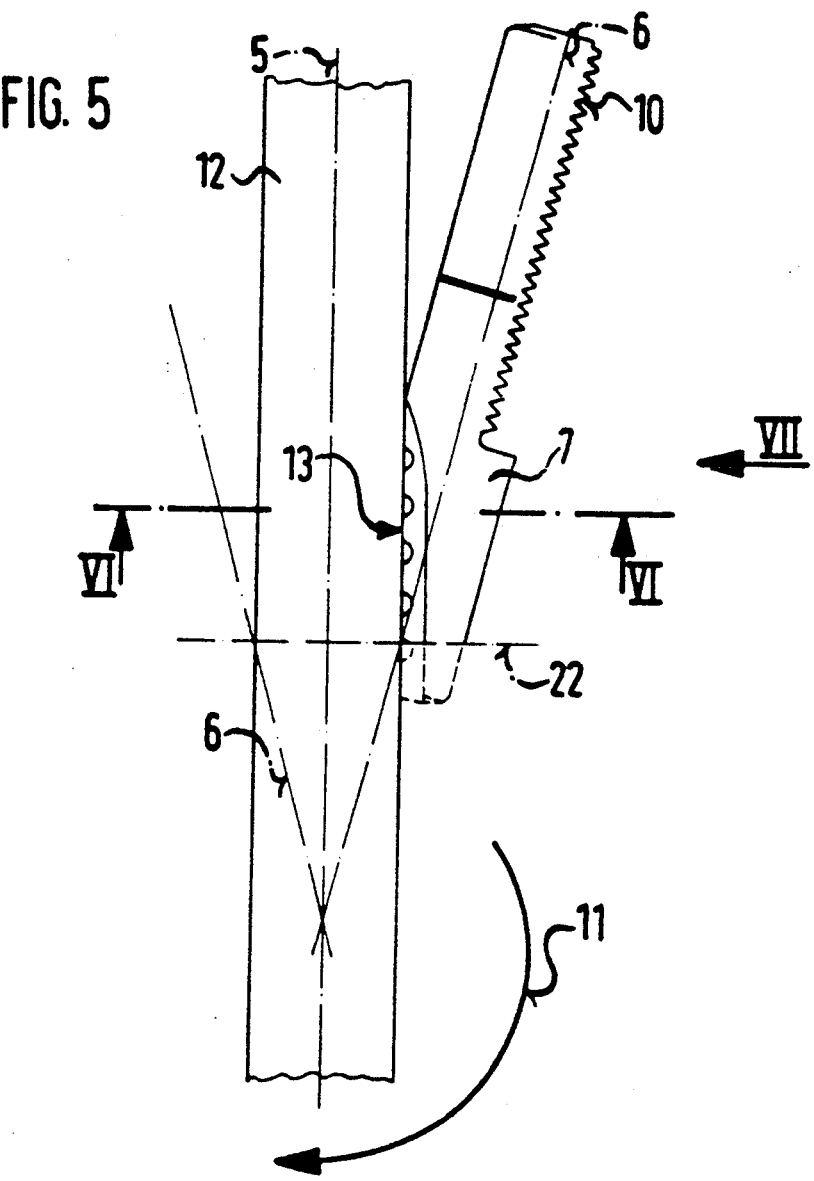
FIG. 5 is a diagrammatic side view illustrating how a chuck jaw engages a tool shaft.
Figure 6:
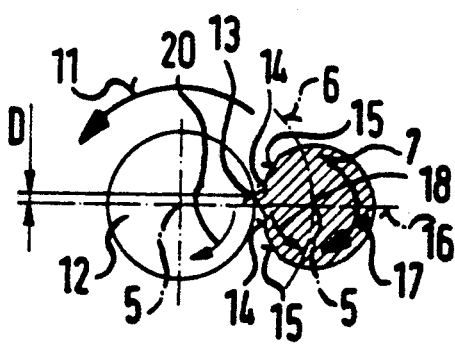
FIG. 6 is a section taken along line VI—VI of FIG. 5.

As better seen in FIGS. 5 through 7 each jaw 7 engages a shaft 12 of the tool to be rotated by means of an entrainment ridge 13 that projects radially inward. More specifically each ridge 13 is of triangular section, projecting radially outward from a secantal and axially extending flat 14 formed on the jaw 7 and joined with the cylindrical outer surface of the jaw by a pair of angled flank surfaces 15 (See also FIG. 20.) extending at an angle of 120° to each other. This construction means that the ridge 13 lies wholly within a cylindrical continuation of the cylindrical outer surface of the respective jaw 7.

The edge of each ridge 13 lies relative to the forward rotation direction 11 parallel to and ahead of a plane 16 defined by the respective jaw axis 4 and the chuck axis 5 by an angular offset D. The inherent play between the teeth 10 and the screwthread 9 means that each jaw 7 can rotate about the respective axis 4 in the directions shown by arrows 17 and 18.

FIG. 6 shows the ridge 13 just as it makes contact with the tool shaft 12. Further tightening will, because of the angular offset of the ridge 13, forcibly rotate the jaw 7 slightly in direction 17, thereby tightening the assembly and taking up any play between the screwthread 9 and teeth 10. During such tightening the jaws 7 will be rotated to move the ridges 13 somewhat more forward. The rotation of the sleeve 8 opposite the direction 11 will compound this angular movement of the jaws 7 about their axes 4 as friction between the teeth 10 and screwthread 9 will inherently urge the jaws 7 rotationally in the direction 17, thus increasing the offset D.

Once thus tightened, use of the tool 12 by rotation of the assembly in direction 11 will have an eccentric tightening effect, ensuring that the tool 12 will remain solidly clamped. Thus the reaction force of drilling is effective in a direction 20 opposite to the direction 11, attempting to rotate the jaw 7 in direction 18. The ridge 13 will dig into the shaft 12 and, in effect, the clamping action will increase with drilling torque.

More particularly as shown in FIGS. 7 and 7a through 7c, the edge of the ridge 13 engages the shaft 12 at lines 21', 21'', and 21'''. Line 22'' corresponds to the FIG. 6 position of the jaw 7. If the chuck is further tightened the jaw 7 rotates in the direction of arrow 17 so as to lie forward of this position along line 21'. When subsequently the tool 12 resists rotation in the direction of arrow 18 the ridge moves to the position of line 21'''. The positions shown at 13', 13'', and 13''' in FIGS. 7a through 7d correspond to the positions of lines 21', 21'', and 21'''. Where the axis 4 intersects the surface of the tool 12 at a level 22 which corresponds to point b there is no significant travel of the edge 13 on the tool 12. Below it at point a travel is in the forward direction and above it at points c and d it is opposite and much greater. Since approximately three-quarters of the length of the ridge 13 lies above the intersection point b, this migration is most important, and in fact it is normal to construct the jaws 7 so that they lie wholly above the level 22 or to cut them back in this region so that they do not contact the workpiece 12 ahead of this level 22. In any case at no time will the ridge 13 move back past the plane 16.

Figure 9:
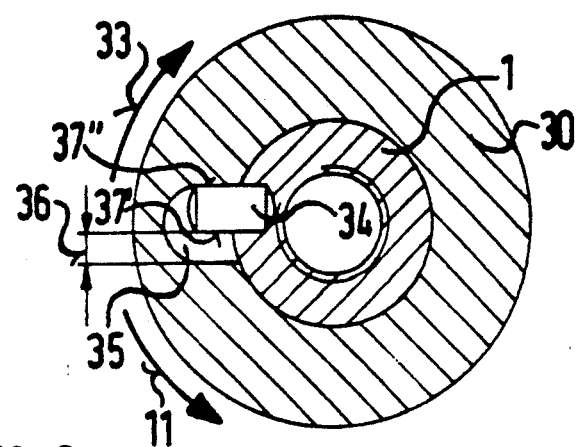
FIG. 9 is a section taken along line IX—IX of FIG. 8.
Figure 8:
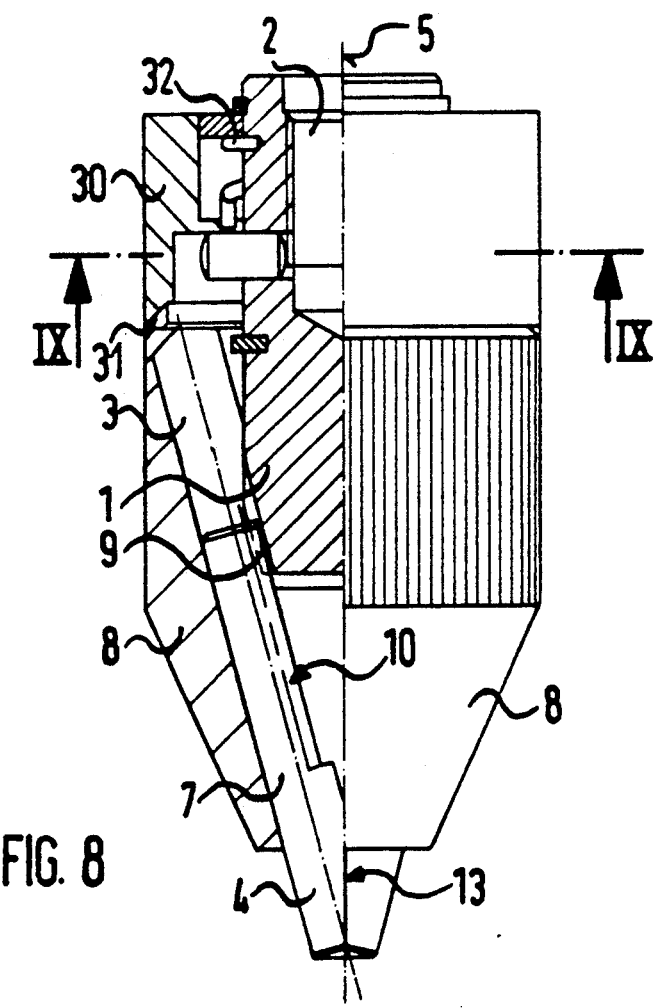
FIG. 8 is a view like FIG. 1 of another chuck according to the invention.

The above-described system is a standard chuck with little self-tightening action. The same inventive features apply to a self-tightening chuck such as shown in FIGS. 8 and 9 where reference numerals identical to those of FIGS. 1 through 7 apply to functionally identical structure. Here the jaw teeth 10 are formed on the inner edges of the jaws 7, the screwthread 9 is formed on the body 1, and the guides 3 are formed in the sleeve 8. A spring 32 permits limited rotation of the locking ring 30 and axially interengaging teeth 31 on the sleeve 8 and on the ring 30 normally couple them rotationally to each other. The spring 32 urges the ring 30 and sleeve 8 normally in the opening direction 11 so that when the teeth 31 are disengaged the ring 30 returns to its starting position. Thus during self-tightening the ring 30 has some room to move angularly in direction 33.

To limit the self-tightening movement the body 1 has a radially outwardly projecting pin 34 that extends into a radially inwardly open pocket or recess 35 formed in the ring 30. The pocket 35 is wider by an angular dimension 36 than the pin 34 which has angularly oppositely directed front and back faces 37' and 37'' that can engage the flanks of the pocket 35 at the end of its travel.

A tool 12 is chucked in this arrangement identically to the system of FIGS. 1 through 7. During drilling, however, there is inherently going to be some torque applied to the jaws 7 that will urge them angularly of the axis 5, tightening the chuck. Since the locking ring 30 permits some such angular movement, the chuck will tighten itself. The ridge 13 will move as described with reference to FIGS. 7a through 7d.

Figure 12:
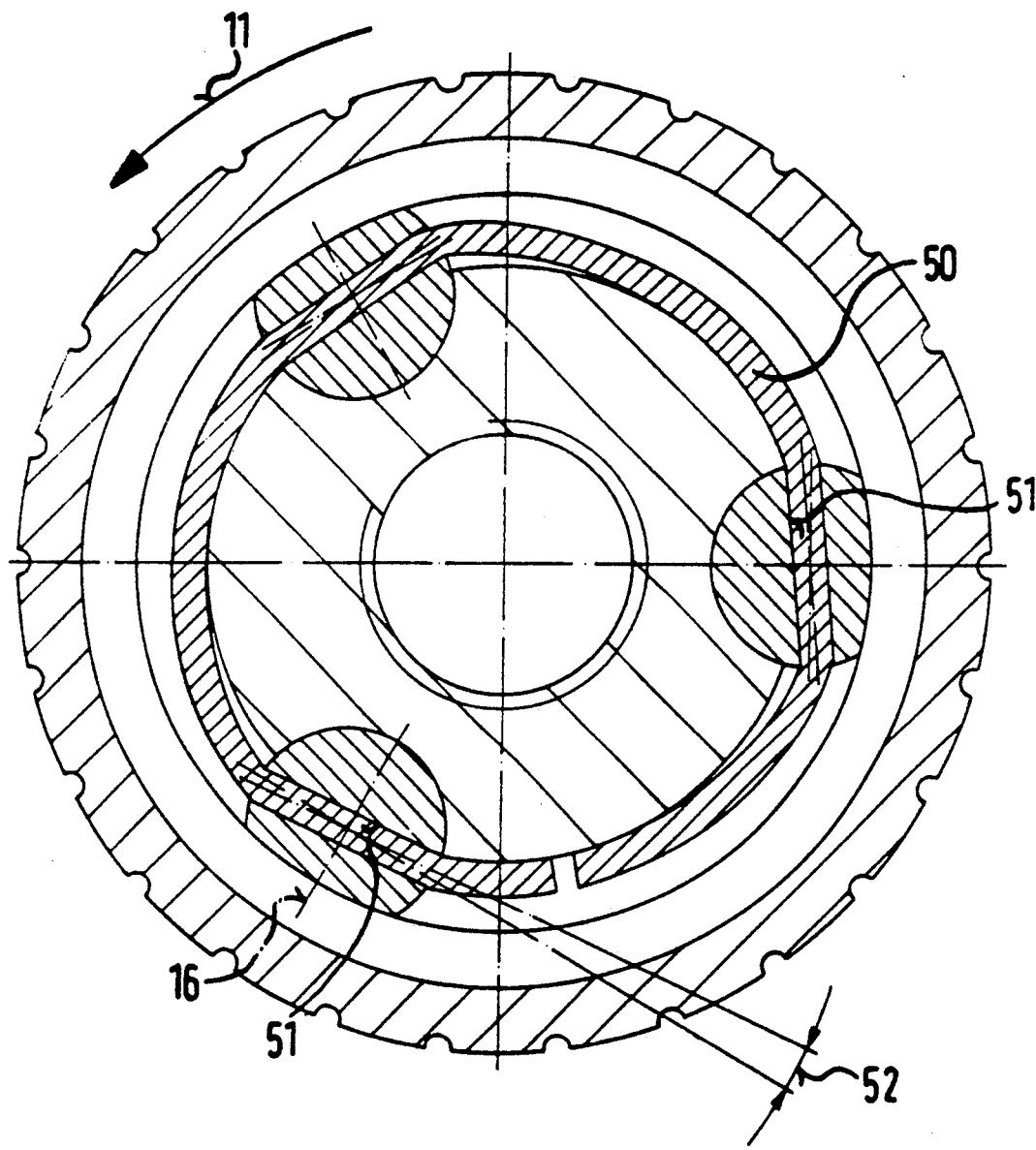
FIG. 12 is a large-scale view of FIG. 11.

In the arrangements of FIGS. 10 through 18 the jaws 7 are each formed with a seat 51 receiving a spring ring that serves to bias them elastically into the forward-pointing position. To this end in FIGS. 10 through 12 the seat 51 is formed as a tangentially throughgoing and axially extending slot through which the circular-section spring 50 extends. The spring 50 is basically annular but has flat sections in the seats 51. The spring 50 is deformed as indicated in FIG. 12 during use of the chuck to allow the jaws 7 to deflect angularly through an angle 52.

Figure 14:
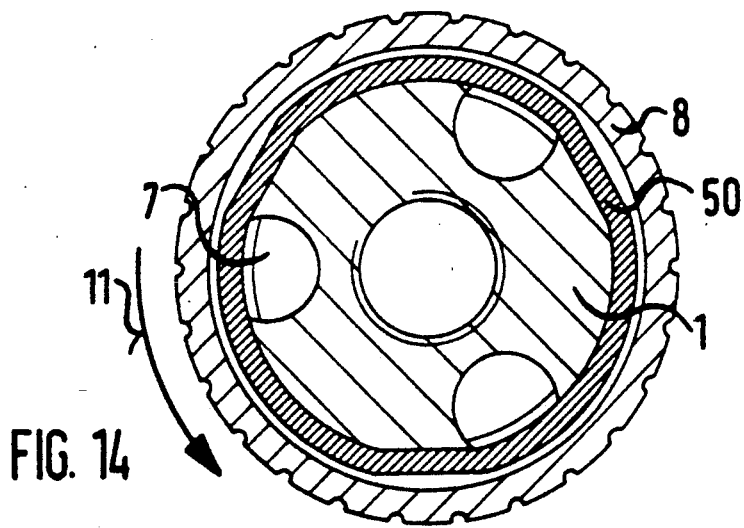
FIG. 14 is a section taken along line XIV—XIV of FIG. 13.
Figure 15:
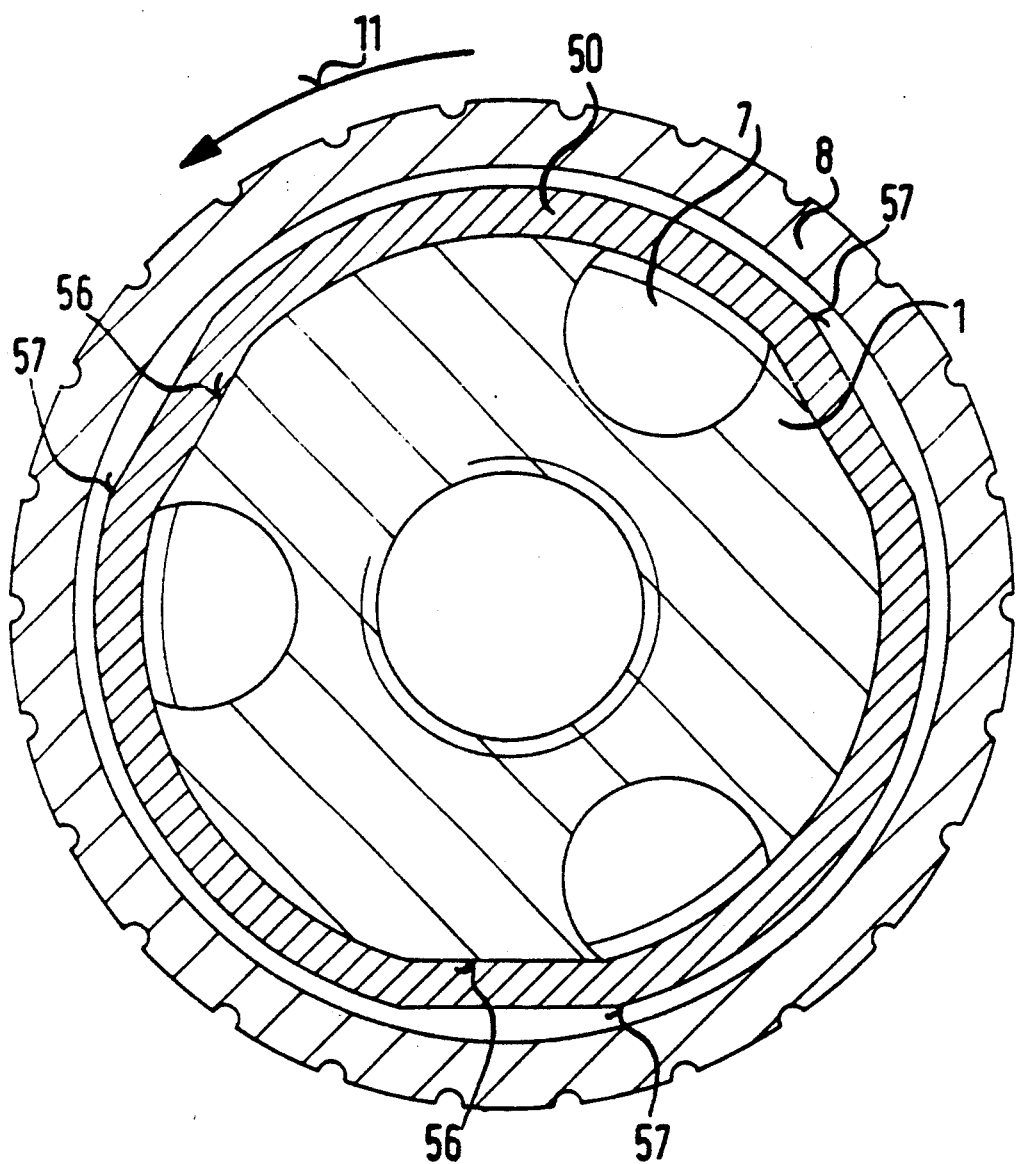
FIG. 15 is a large-scale view of FIG. 14.

FIGS. 13 through 15 show the spring ring 50 formed with flats 57 riding on complementary flats 56 of the body 1 and radially inwardly engaging the outer edges of the jaws 7. This spring ring 50 is held down by a ring 55 forming part of the sleeve 8. This ring 50 is annularly continuous.

Figure 16:
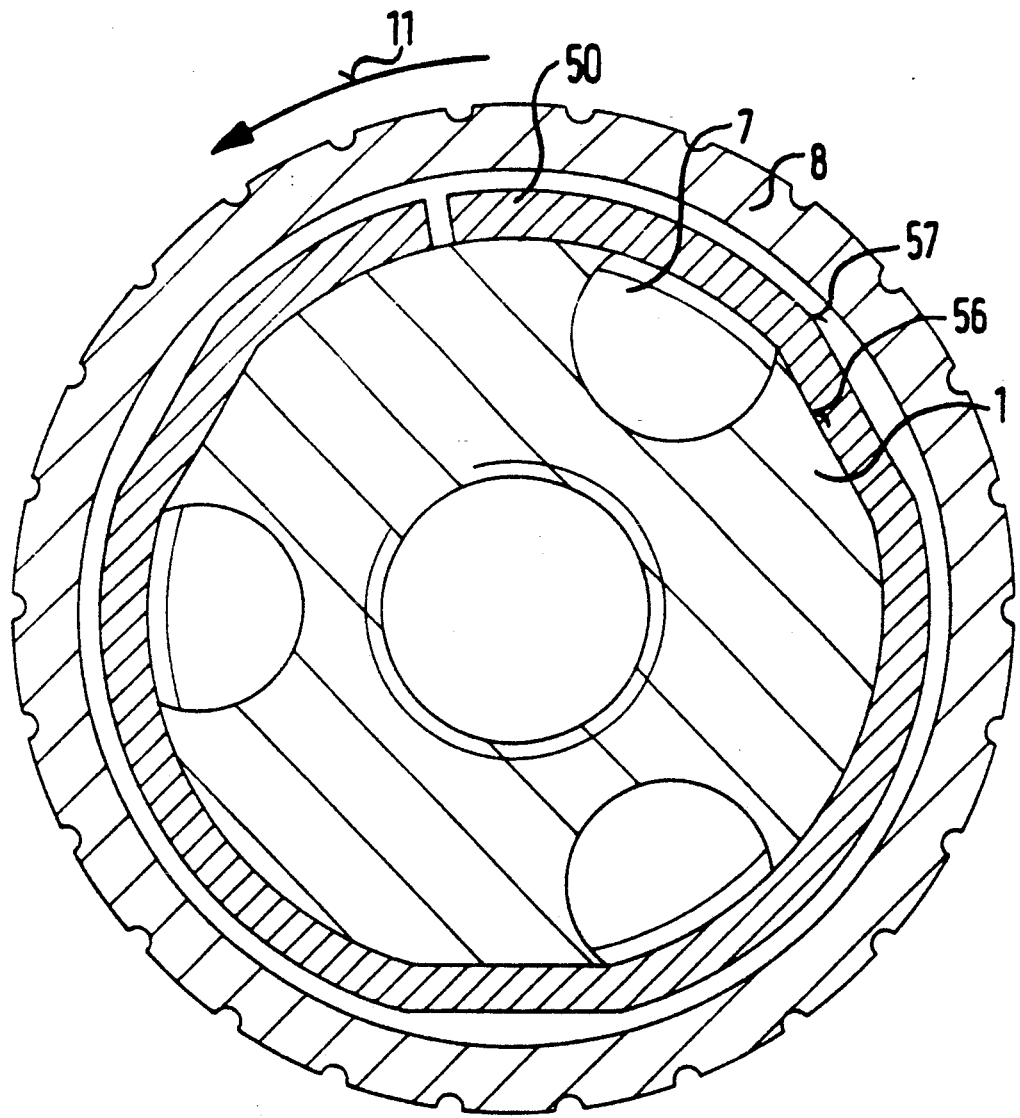
FIGS. 16 through 18 are views like FIG. 15 of further variations on the chuck.

In FIG. 16 the spring ring 50 is identical to that of FIGS. 13 through 15, but it is split. This makes assembly of the device simpler.

Figure 17:
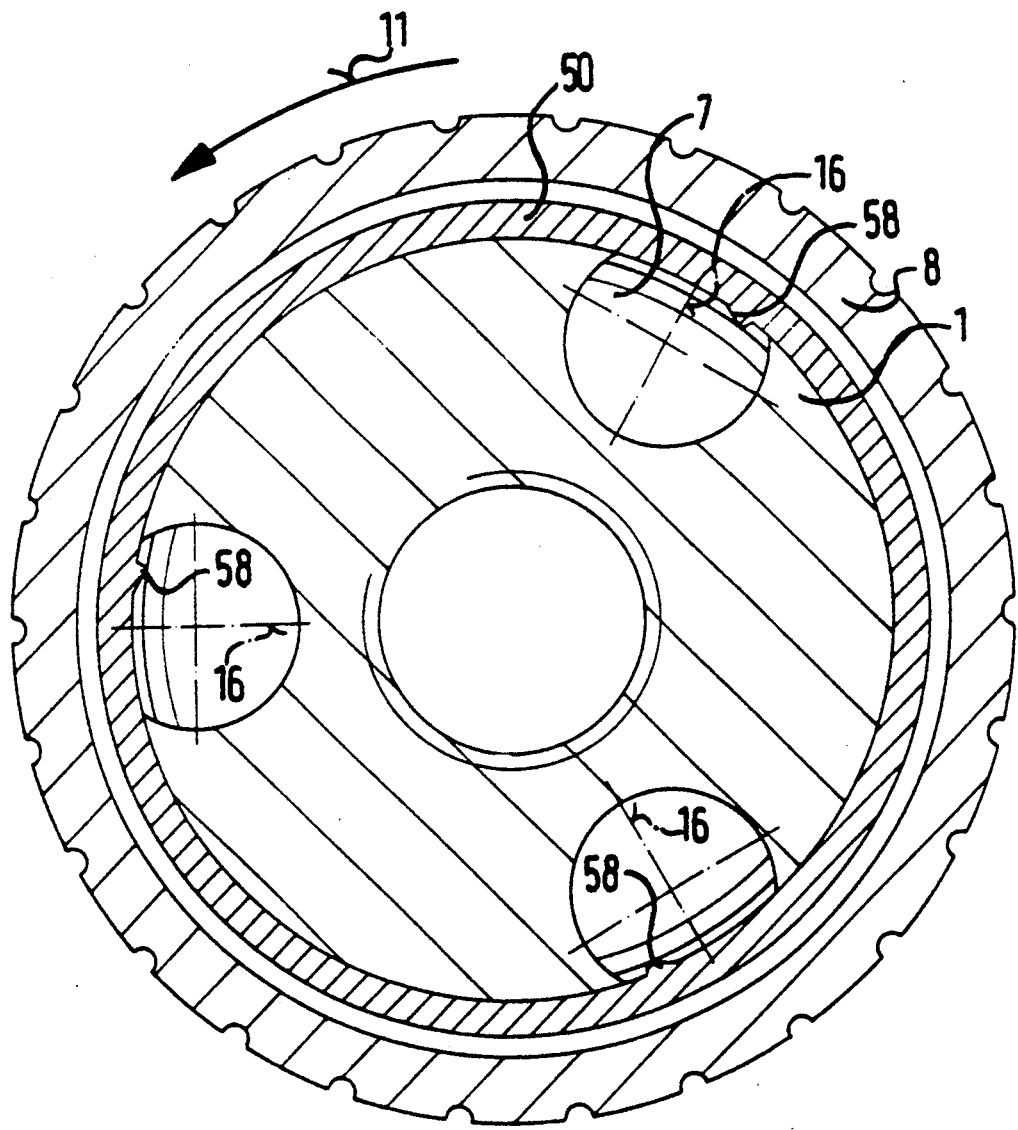

FIG. 17 shows a system like that of FIGS. 13 through 15 but with a perfectly circular ring, that is without the flats 57, and having instead spurs 58 that engage the jaws 7 offcenter to twist them into the desired starting positions.

Figure 18:
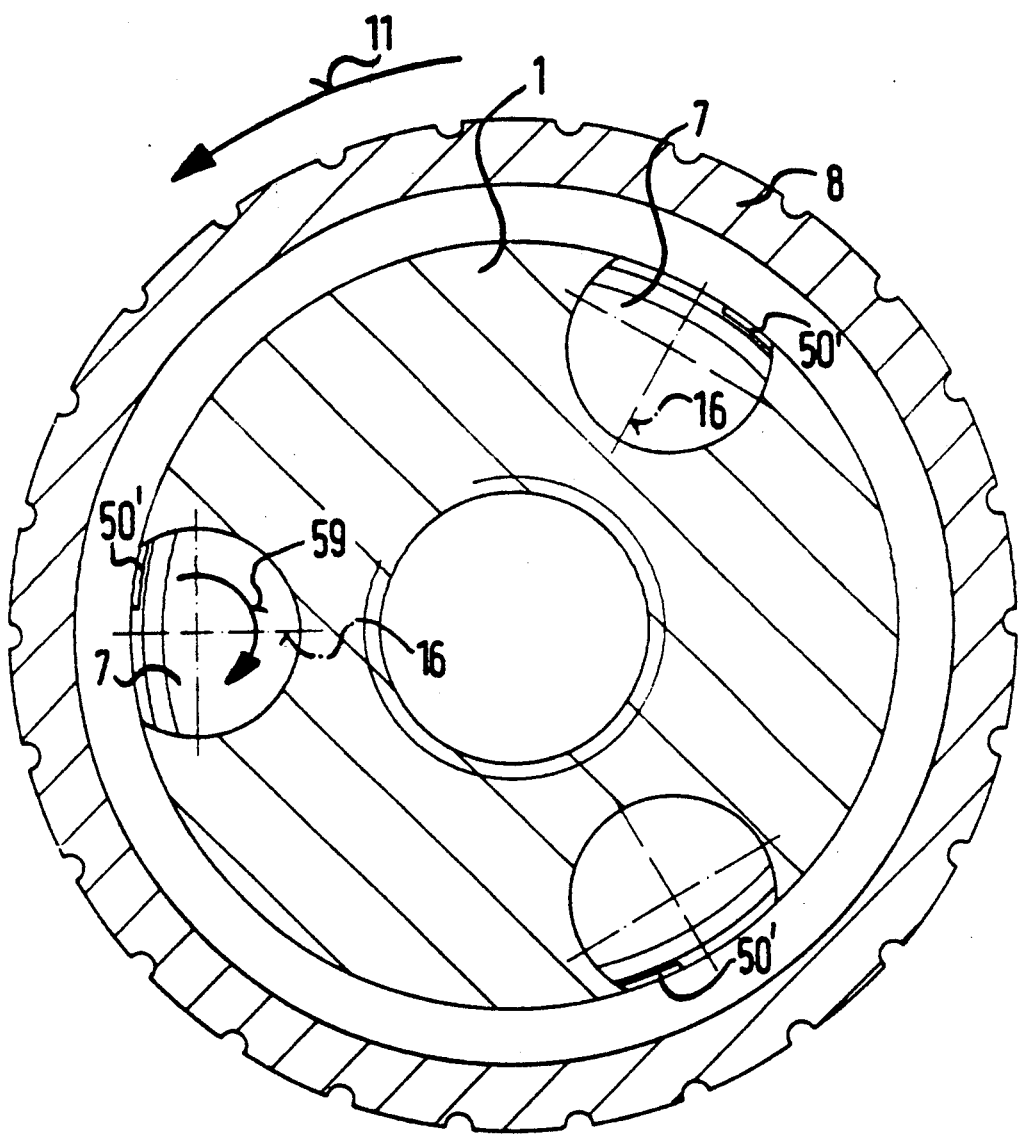

FIG. 18 shows a small elastic bumper 50' secured offcenter on each jaw 7 to urge them elastically as indicated by arrow 59 into the desired forward-pointing starting position.

Figure 19:
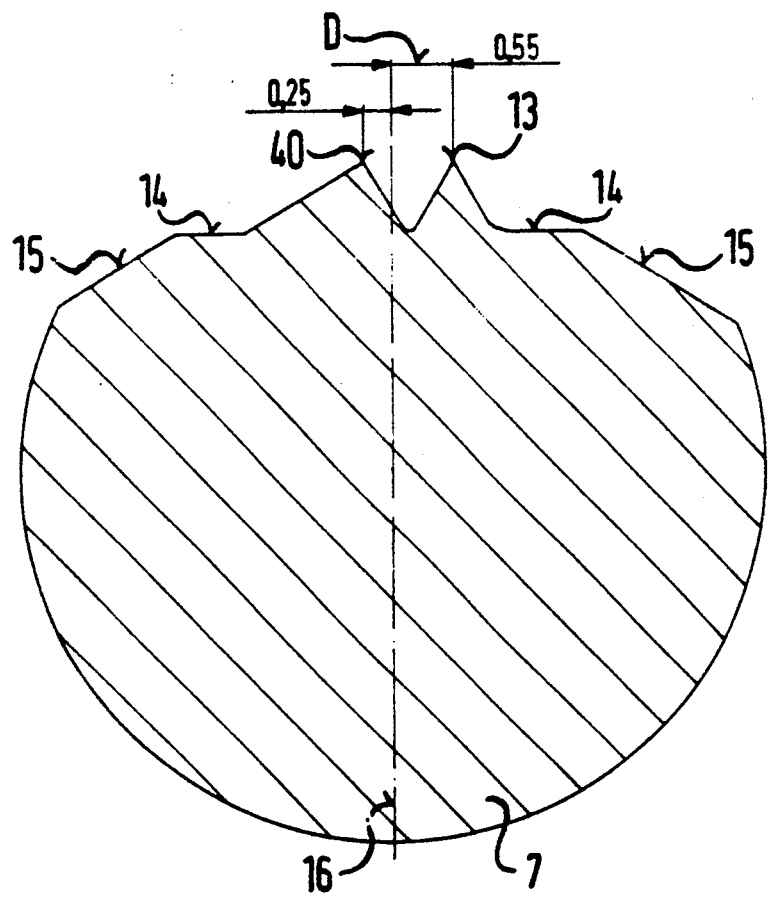
FIG. 19 is a large-scale cross section through another chuck jaw in accordance with this invention.
Figure 20:
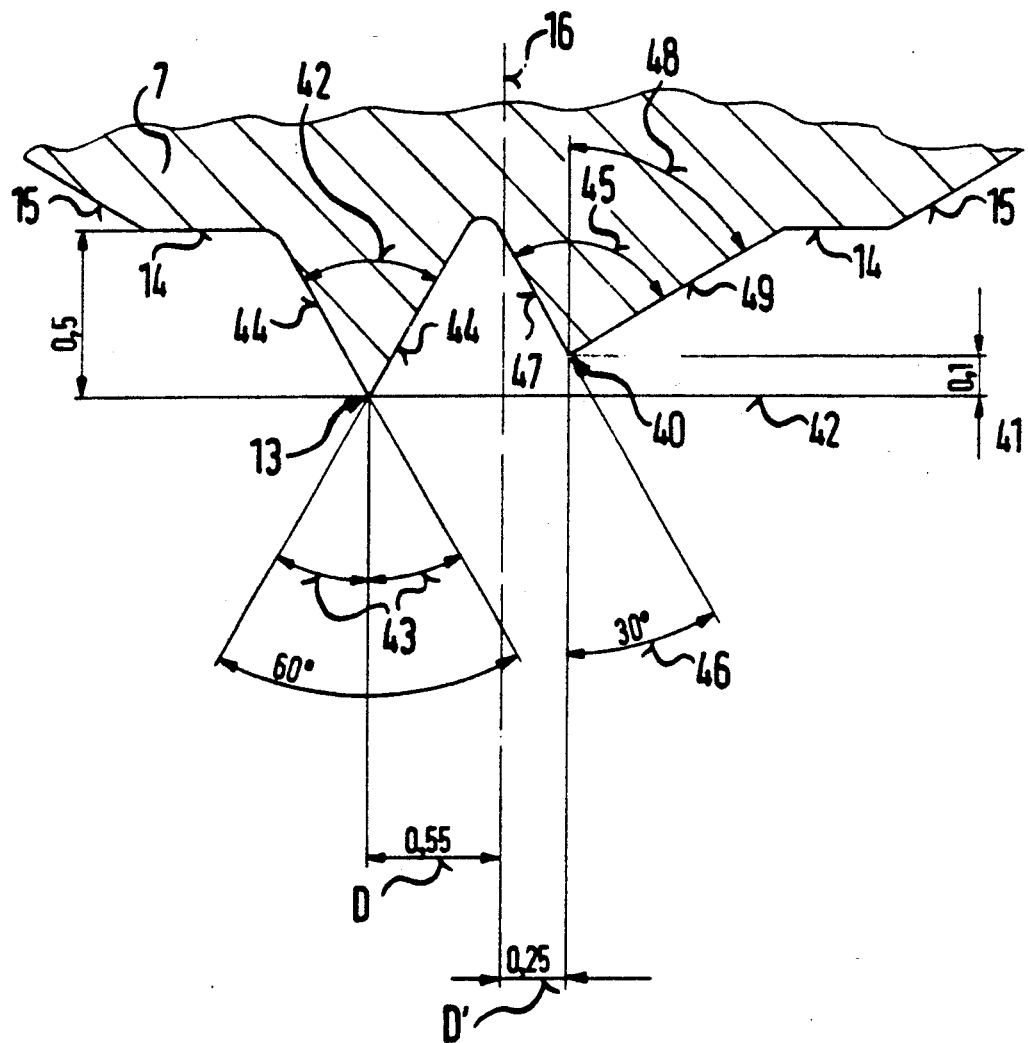
FIG. 20 is a large-scale view of a detail of FIG. 19.

FIGS. 19 and 20 show an alternative arrangement of a jaw 17 formed with a second ridge 40 parallel to the first ridge but set by a spacing 41 of 0.1 mm back from a plane 42 perpendicular to the respective plane 16 and just touching the edge of the ridge 13. The ridge 40 is spaced axially to the opposite side of the plane 16 by a spacing D' or 0.25 mm which is substantially smaller than the forward spacing D of 0.55 mm. The ridge 13 has side flanks 44 extending at an angle 43 of 60° to each other, with a bisector of the ridge 13 parallel to the plane 16. The ridge ridge 40 has front and back flanks 47 and 49 extending it an angle 45 of 90° to each other with the front flank 47 forming an angle 46 of 30° to the plane 16 and the back flank 490 an angle 48 of 60°.

I claim:

1. A drill chuck for use with a tool having a shaft, the chuck comprising:
   a chuck body centered on and rotatable about a chuck axis;
   an adjustment body centered on the chuck axis, rotatable about the chuck axis on the chuck body, and axially fixed on the chuck body, one of the bodies being formed with a plurality of angularly equispaced jaw-guide passages centered on respective jaw axes all lying on the surface of an imaginary cone centered on the chuck axis, the other of the bodies being formed with a screwthread centered on the chuck axis and exposed in the guide passages; and
   respective jaws displaceable in the passages along the respective jaw axes and each formed with
   a row of teeth meshing with the screwthread, whereby relative rotation of the bodies in one direction moves the jaws radially inward and axially forward and opposite relative rotation moves the jaws radially outward and axially backward,
   a generally axially extending first entrainment ridge projecting radially inward relative to the chuck axis from the respective jaw, lying offset forward, relative to a normal rotation direction of the chuck when drilling, from a respective jaw plane including the respective jaw axis and the chuck axis, and lying mainly within the imaginary cone, and with
   a second such entrainment ridge offset from the respective first ridge and lying relative to the normal rotation direction behind the respective first ridge, each second ridge being offset radially of the respective jaw axis inward with respect to the respective first ridge from a respective plane perpendicular to the respective jaw plane.

2. The drill chuck defined in claim 1 wherein the radial offset between the two ridges is about 0.1 mm.

3. The drill chuck defined in claim 2 wherein the radial offset is generally equal to the thickness of a spur dug up by the first ridge.

4. The drill chuck defined in claim 1 wherein each second ridge is offset behind the jaw plane by a spacing that is smaller than a spacing by which the respective first ridge is offset ahead of the jaw plane relative to the rotation direction.

5. The drill chuck defined in claim 4 wherein each second ridge is offset behind the jaw plane by about 0.25 mm and the respective first ridge is offset ahead of the jaw plane by about 0.55 mm.

6. The drill chuck defined in claim 1 wherein each first ridge has a flank angle of about 60° and is symmetrical to a first-ridge plane parallel to the respective jaw plane, each second ridge having a flank angle of about 90° and having a front flank inclined at about 30° to the respective jaw plane and a rear flank inclined at about 60° to the respective jaw plane.

7. The drill chuck defined in claim 1, further comprising
   spring means engaged between the jaws and at least one of the bodies for urging the jaws angularly of the respective jaw axes into a forward-pointing position relative to the rotation direction.

8. The drill chuck defined in claim 7 wherein the spring means includes a spring ring radially engaging the jaws.

9. The drill chuck refined in claim 8 wherein the spring ring is split.

10. The drill chuck defined in claim 7 wherein the jaws are formed with angularly throughgoing bores through which the spring ring extends.

11. The drill chuck defined in claim 7 wherein the spring ring is annularly continuous.

12. The drill chuck defined in claim 11 wherein the spring ring bears radially inward on the jaws.

13. The drill chuck defined in claim 12 wherein the ring and chuck body are formed with complementary and radially engaging flats.

14. The drill chuck defined in claim 12 wherein the ring is provided at each jaw with a bumper engaging the respective jaw offset from the respective jaw plane.

15. The drill chuck defined in claim 7 wherein the spring means includes respective elastic bumpers on the jaws offset from the respective jaw planes and radially engaging one of the bodies.

* * * * *